C. G. HAWLEY.
FLEXIBLE FLUID JOINT.
APPLICATION FILED MAY 6, 1905.

900,533.

Patented Oct. 6, 1908.
2 SHEETS—SHEET 1.

Witnesses:

Inventor

C. G. HAWLEY.
FLEXIBLE FLUID JOINT.
APPLICATION FILED MAY 6, 1905.
900,533.
Patented Oct. 6, 1908.
2 SHEETS—SHEET 2.
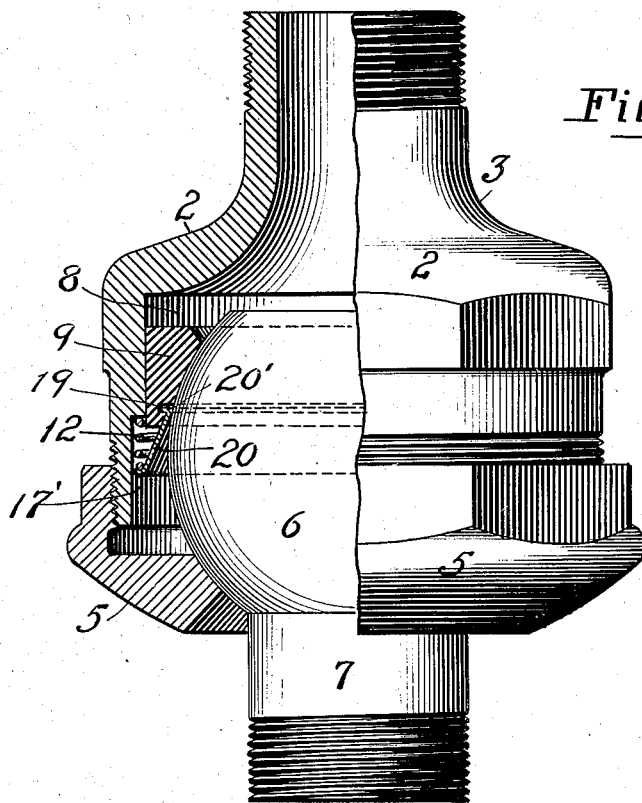
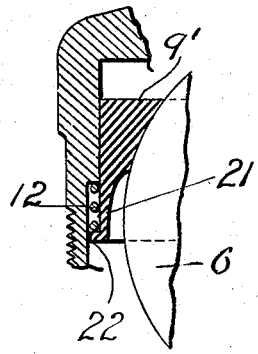
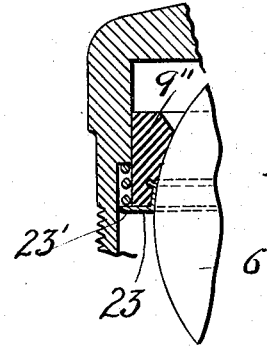
Witnesses:
Inventor

UNITED STATES PATENT OFFICE.

CHARLES GILBERT HAWLEY, OF CHICAGO, ILLINOIS, ASSIGNOR, BY DIRECT AND MESNE ASSIGNMENTS, TO BARCO BRASS AND JOINT COMPANY, OF CHICAGO, ILLINOIS, A CORPORATION.

FLEXIBLE FLUID-JOINT.

No. 900,533.     Specification of Letters Patent.     Patented Oct. 6, 1908.

Application filed May 6, 1905. Serial No. 259,190.

*To all whom it may concern:*

Be it known that I, CHARLES G. HAWLEY, a citizen of the United States, residing at Chicago, in the county of Cook and State of Illinois, have invented a certain new, useful, and Improved Flexible Fluid-Joint, of which the following is a full, clear, and exact description, such as will enable others skilled in the art to which it appertains to make and use the same.

My invention relates to improvements in flexible joints for fluid pipes, and particularly for such as are employed in the conveyance of fluids under low pressure.

In flexible joints for low pressure pipes or conduits the pressure within the joint or coupler members cannot be depended upon to hold said members in such contact as to prevent leakage, and it becomes necessary to provide a packing of some sort to which extraneous pressure may be applied and which will maintain a tight joint at all times.

The object of this invention is to provide a flexible joint for use in water pipes or conduits, which joint shall be of simple, economical and durable construction, and further, which may be provided with packing means that may be depended upon to prevent leakage at the joint under all circumstances.

The particular object of the invention is to provide a ball and socket fluid joint in which there shall be employed a gasket ring composed of non-metallic material, such as hard rubber, so pressed upon that it shall always firmly engage both members of the ball and socket joint.

With these objects in view, my invention consists in a flexible joint conduit for various fluids, and comprising a ball member and a socket member equipped with a suitable gasket that is interposed between said members, there being a spring which presses or draws upon the gasket in such manner as to hold the same in firm contact with both members of the joint. And further, my invention consists in various constructions and in combinations of parts, all as hereinafter described and particularly pointed out in the claims.

Figure 1:
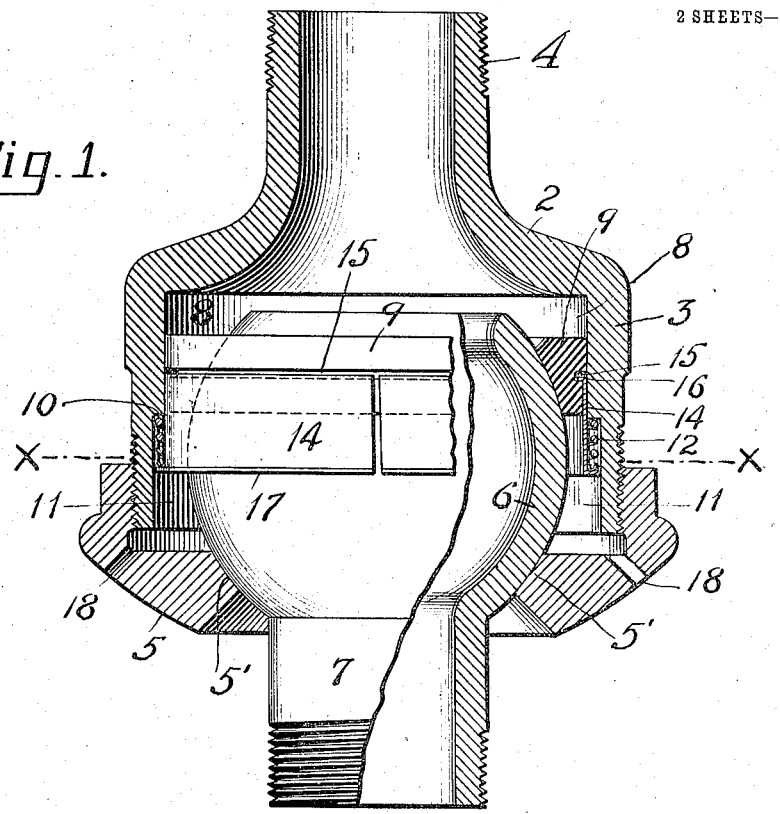
Figure 2:
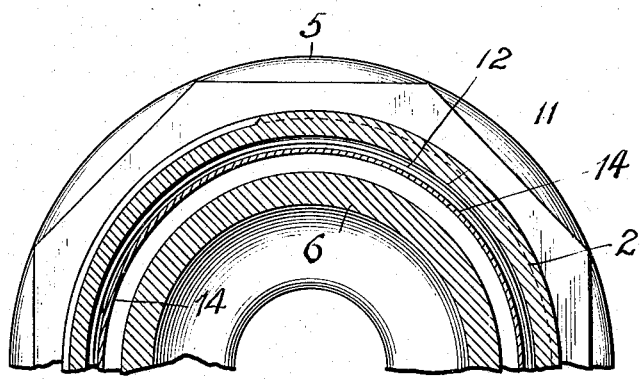

The invention will be more readily understood by reference to the accompanying drawings forming a part of this specification, and in which Figure 1 is a sectional view of a flexible fluid joint embodying my invention, portions of the ball member and the gasket device being shown in full lines; Fig. 2 is a partial transverse section of the joint on the line $x$—$x$ of Fig. 1: Fig. 3 is another sectional view of the joint, illustrating the gasket device in modified form; and Figs. 4 and 5 are detail sectional views, illustrating still further modifications of the gasket device.

In carrying out my invention I provide a socket member, 2, having a substantially cylindrical portion, 3, and a shank, 4. The ends of the portions 3 and 4, are threaded, as shown, the former receiving the socket ring, 5. I also provide a ball member, 6, having a shank, 7, and seated in the socket, 5′, in ring, 5. As shown, both members are hollow to form a fluid conduit. Both parts, 3 and 5, are preferably provided with polygonal portions, for instance, see Fig. 2, by which they may be screwed together. The ring, 5, is provided with an opening which is larger than the shank, 7, on the ball, and this permits the ball to swing or oscillate within the socket member. The socket member, 2, is provided with a smooth, internal cylindrical wall, 8, and between this wall and the upper or inner portion of the ball, 6, I arrange a gasket, 9. The gasket is preferably made of non-metallic material in the nature of hard rubber, any suitable compound being employed. The gasket is a complete ring, having a cylindrical outer surface or periphery, reduced in diameter near the lower or outer end of the gasket. The inner surface of the gasket is convex, to fit the ball.

It will be noted that the lower portion of the socket member is of greater internal diameter than the upper portion, and that there is an annular shoulder, 10, between the cylindrical surfaces, 8 and 11. Within the space thus afforded, I arrange a coil or spiral spring, 12, which exerts its force upon the gasket, 9, tending to draw the same downward or outward, so as to cause the gasket to firmly press upon both the cylindrical wall, 8, of the socket member, and the spherical ground surface of the ball member. I may employ various means for connecting the spring, 12, and the gasket, 9. The connecting device which I prefer is illustrated in Figs. 1 and 2, the same comprising a split ring or sleeve, 14, of sheet metal. At the top, the split ring or sleeve is provided with an inwardly turned flange, 15, which enters the groove, 16, in the periphery of the gasket. The lower edge of the ring, 14, has an outwardly turned flange, 17, and the spring, 12, is confined between this flange, 17, and the shoulder, 10, of the socket member, 2. It is obvious that the sleeve or ring, 14, in any desired form may be a complete ring, either molded into the gasket when the gasket is formed, or connected to the gasket by the in-turning of its flange, 15. Such a construction, however, necessitates the operation of a machine to connect the ring to the gasket, and it is for this reason that I prefer to split, cut or open the ring, as shown in Fig. 1. The split ring may be readily clasped around the gasket before the gasket is inserted in the socket member, 2, and when once inserted therein, will be held in place through being confined between the gasket and the adjacent walls of the socket member. In assembling my device, the spring is first placed within the socket member. The gasket, with its flanged ring, is then put into place, and the ball is afterward inserted, whereupon the socket ring, 5, may be screwed upon the socket member to retain the ball therein.

My flexible joint possesses the advantage of being easy to dis-member, the removal of the socket ring or cap, 5, being the only operation required to free all of the parts.

My joint may be employed in high pressure pipes or conduits, but is particularly intended for the conveyance of low pressure fluids, the pressure of which upon the packing gasket, 9, could not be depended upon to force the gasket tightly against the coupler members, unless assisted by the pressure or draft spring. I desire to direct particular attention to the fact that the spring and the metal part or connection, 14, are both at the outer or free end of the gasket, and therefore are not exposed to the action of the fluid in the joint or coupling. To prevent an accumulation of fluid in the cavity beneath the gasket, I preferably provide the follower or socket ring, 5, with one or more drain holes 18.

While, as stated, I prefer that form of the joint which is illustrated in Fig. 1, I do not intend to confine my invention thereto, as the invention is capable of embodiment in numerous other forms, such, for example, as that of Fig. 3. In this case (Fig. 3) I provide the gasket, 9, with an internal groove, 19, and employ a conical connector ring, 20, having an outwardly turned flange, 20', at its upper edge, and another outwardly turned flange, 17', at its lower edge. The spring, 12, is arranged between the flange 17', and the shoulder of the socket member, 2, as in Fig. 1, the pressure thereof acting to draw the gasket downward and outward, as above described. The construction of Fig. 3 is advantageous, in so far as it provides wider bearing surfaces between the gasket and the coupler members.

If desired, the connector may be formed integrally with the gasket, as illustrated in Fig. 4, wherein the gasket, 9, is shown to have a deep flange or edge, 21, having the lateral flange, 22, to receive the gasket spring. Still another construction is illustrated in Fig. 5, wherein the spring flange, 23', of the gasket, is formed by extending or widening a sheet metal ring, 23, by which the lower, thin edge of the gasket, 9", is armored.

The drawings serve to show that the gasket spring flange may be formed in many ways, and it will be obvious that the spring may be of a different form and differently located, all without departing from the spirit of my invention. For this and like reasons, I do not confine my invention to the specific constructions herein shown and described. It is also obvious that my invention is not, of necessity, limited to ball and socket joints, but may be used in many forms of rotary joints wherein gaskets of wedge-like form in cross section require to be pressed into engagement with the coupler members.

Having thus described my invention, I claim as new and desire to secure by Letters Patent:—

1. A conduit joint of the class described, comprising suitable members, in combination with a gasket of wedge-like form in cross section, arranged between said members, and a spring arranged at the small end of said gasket and adapted to draw the same into engagement with said members, substantially as described.

2. In a conduit joint of the class described, suitable joint members, in combination with a gasket of wedge-like form in cross section, arranged between said members to close the joint, a flange at the small end of said gasket and a suitable spring engaging said flange and acting to draw the gasket between and against said members, as and for the purpose specified.

3. In a conduit joint of the class described, suitable joint members having a wedge-like space between them, in combination with a gasket of wedge-like form occupying said space to close the same and adapted to be forced into place by fluid pressure within the joint, and a spring interposed between the wall of one of said members and said gasket at the outer end of the joint, in position to be protected from the action of fluids, substantially as described.

4. In a ball and socket joint of the class described, a socket member having a ball socket, in combination with a ball member seated in said socket and having a shank, a gasket ring of wedge-like cross section within said socket member and engaging the same and said ball member, and a spring arranged in the outer end of said socket member adjacent to the shank of the ball member and connected with said gasket, as and for the purpose specified.

5. In a ball and socket joint of the class described, a socket member having an internal cylindrical wall and an annular shoulder, in combination with a ball member arranged within said socket member and having a shank, a gasket having surfaces that engage said cylindrical wall and said ball member, a spring flange upon said gasket projecting in the direction of the shank of the ball member and a spring arranged between said flange and said shoulder, substantially as described.

6. In a ball and socket joint of the class described, a socket member having an internal packing surface and provided at its outer end with a socket member, in combination with a ball member seated in said member and having a shank projecting therethrough, a gasket engaging said packing surface and said ball member and adapted to be tightened on both by fluid pressure within the joint, a flange upon said gasket and a spring within the outer end of said socket member adjacent to the shank of the ball member and pressing upon the gasket flange to draw and hold the gasket between said members, substantially as described.

7. In a ball and socket joint of the class described, a socket member having a substantially cylindrical internal wall and an annular shoulder, in combination with a socket ring attached to the outer end of said socket member, a ball member within said socket member and seated in said ring, a gasket arranged within the inner end of said socket member and between the ball member and said cylindrical wall, a flange upon the outer end of said gasket adjacent to said socket ring, and a spring arranged in the outer end of said socket member between the flange of the gasket and the annular shoulder of said socket member, substantially as described.

8. In a ball and socket joint of the class described, a socket member having a substantially cylindrical internal wall and provided with an internal annular shoulder, in combination with a ball arranged within said socket member, a gasket fitting said ball member and said cylindrical wall, a metal ring engaged with said gasket and provided with a flange, and a spring arranged between said flange and said shoulder, substantially as described.

9. In a ball and socket joint of the class described, a socket member having a suitable socket, in combination with a ball member, a gasket arranged between the internal wall of said socket member and the ball member, an open or split metal ring engaging with said gasket and provided with a flange, and a spring engaging with said flange within said socket member, as and for the purpose specified.

10. In a ball and socket joint of the class described, a socket member, in combination with a ball member, a gasket fitting said members, a split ring having a flange held in engagement with said gasket by the internal wall of said socket member, and a spring acting upon the outer end of said ring, substantially as and for the purpose specified.

11. In a ball and socket joint of the class described, a socket member having internal cylindrical walls, 8 and 11, and provided with an annular shoulder, 10, in combination with a ball member, a gasket, 9, arranged between said ball member and said wall, 8, said gasket having a peripheral groove, a split sheet metal ring having a flange occupying the groove in said gasket, said ring being provided with a flange and the spring arranged between said flange and said shoulder, 10, substantially as described.

12. In a ball and socket joint of the class described, a socket member provided with a cylindrical internal wall, in combination with a socket ring attached to the outer end of said socket member and provided with drain openings, a ball member seated in said socket ring, a gasket ring arranged in the inner end of said socket member between said cylindrical wall and said ball member, a sheet metal ring flanged upon said gasket and the spring engaging said ring within said socket member, substantially as described.

13. A ball and socket joint of the class described, comprising a socket member having a suitable ball socket, in combination with a ball member seated in the socket of said socket member, a gasket ring within said socket member and engaging the inner or wet end of the ball member, and means at the outer or dry end of said gasket ring for drawing the same into engagement with both said members to close the joint therebetween at all times, substantially as described.

In testimony whereof, I have hereunto set my hand, this 4 day of April, 1905, at Chicago, county of Cook and State of Illinois, in the presence of two subscribing witnesses.

CHARLES GILBERT HAWLEY.

Witnesses:
EDWARD E. SILK,
JOHN R. LEFEVRE.